United States Patent
Carthew et al.

(10) Patent No.: US 10,946,982 B2
(45) Date of Patent: Mar. 16, 2021

(54) SYSTEMS AND METHODS FOR ROOF-TOP UAV DELIVERY

(71) Applicant: Ford Global Technologies, LLC, Dearborn, MI (US)

(72) Inventors: James Carthew, Oakland, CA (US); Zijian Wang, Stanford, CA (US); Aditya Singh, Redwood City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 16/225,925

(22) Filed: Dec. 19, 2018

(65) Prior Publication Data
US 2020/0198801 A1    Jun. 25, 2020

(51) Int. Cl.
| | | |
|---|---|---|
| B64F 1/32 | (2006.01) | |
| B64D 1/12 | (2006.01) | |
| E01F 3/00 | (2006.01) | |
| B64C 39/02 | (2006.01) | |
| G06Q 10/08 | (2012.01) | |

(52) U.S. Cl.
CPC .................. B64F 1/32 (2013.01); B64D 1/12 (2013.01); E01F 3/00 (2013.01); *B64C 39/024* (2013.01); *B64C 2201/027* (2013.01); *B64C 2201/128* (2013.01); *B64C 2201/145* (2013.01); *G06Q 10/0832* (2013.01)

(58) Field of Classification Search
CPC ........................................................ B64F 1/32
See application file for complete search history.

(56) References Cited

U.S. PATENT DOCUMENTS

| | | | |
|---|---|---|---|
| 9,302,770 B2 | 4/2016 | Burgess et al. | |
| 9,536,216 B1 | 1/2017 | Lisso | |
| 10,351,261 B1* | 7/2019 | Bryant | G07F 9/002 |
| 10,501,205 B1* | 12/2019 | Siewert | B64F 1/32 |
| 2017/0267348 A1 | 9/2017 | Sweeny et al. | |
| 2018/0141682 A1* | 5/2018 | Blake | B64F 1/22 |

OTHER PUBLICATIONS

Bhattacharaya, A. (Dec. 29, 2016). Amazon patented a hovering airship warehouse that shoots out delivery drones. Quartz (6 pages). Retrieved from https://qz.com/874600/amazon-amzn-patented-a-hovering-airship-warehouse-that-shoot-out-delivery-drones/.
DHL: Unmanned aerial vehicles in logistics. A DHL perspective on implications and use cases for the logistics industry. DHL Customer Solutions & Innovation, Troisdorf, Germany, 2014 (24 pages).
FedEx plans to test delivery drones for airplane parts and more (May 11, 2018). Digital Commerce 360 (8 pages). Retrieved from https://www.digitalcommerce360.com/2018/05/11/fedex-plans-to-test-delivery-drones-for-airplane-parts-and-more/ and-more/.
Mogg, T. (Aug. 17, 2017). Delivery chutes' are Amazon's latest idea for its drone delivery service. Digital Trends (12 pages). Retrieved from https://www.digitaltrends.com/cool-tech/amazon-drone-delivery-chute/.

\* cited by examiner

*Primary Examiner* — Jonathan Snelting
(74) *Attorney, Agent, or Firm* — Brandon Hicks; Eversheds Sutherland (US) LLP

(57) ABSTRACT

A system and method for receiving a package from an unmanned aerial vehicle at a rooftop package receiving station and securely holding the package at the package receiving station. The recipient, using a computing device, may prompt the package receiving station to deliver the package from the rooftop to a delivery location.

20 Claims, 10 Drawing Sheets

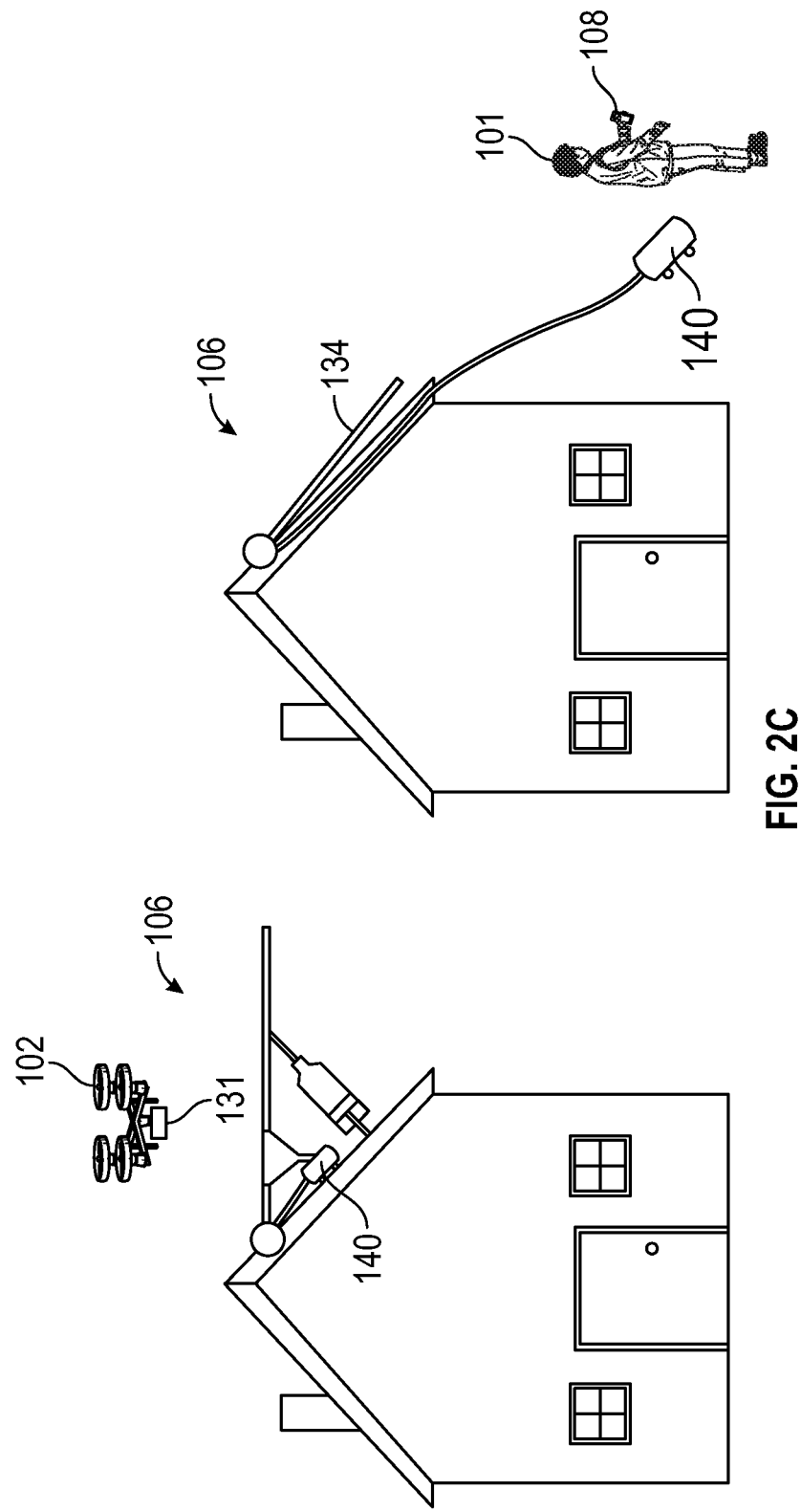

SYSTEMS AND METHODS FOR ROOF-TOP UAV DELIVERY

FIELD OF THE DISCLOSURE

The disclosure generally relates to the delivery of packages by unmanned aerial vehicles, and more particularly to systems and methods for delivering a package from an unmanned aerial vehicle to a roof-top receiving station.

BACKGROUND

Unmanned Aerial Vehicles ("UAV") can act as last mile couriers in an autonomous package delivery system. In such a system, the UAV transports packages from a UAV dispatch warehouse or an autonomous delivery van to individual addresses on a street. Delivering packages to the front door requires the UAV to travel close to the ground. Low altitude autonomous flight is complicated due to a number of potential hazards, including environmental hazards such as trees and other vegetation or pedestrians and animals. Various features of the property architecture such as fencing, awnings, flagpoles, and overhead wiring, can also be hazardous to a UAV attempting a ground level delivery to a 'front door' area.

Further complicating ground level deliveries for UAVs is poor localization and UAV navigation and control due to the deterioration of GPS signal reception caused by signal obstruction and multi-path effects in low altitude. Poor UAV navigation and control negatively affects the UAV's ability to successful deliver a package on target, while also posing a risk of a collision between the UAV and property or pedestrians.

Ground level package delivery also involves an elevated risk of package theft because a 'front door' delivery is commonly made onto the ground in a position visible from the street rather than into a secure receptacle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2C depicts a rooftop package receiving station in accordance with one or more embodiments of the disclosure.

DETAILED DESCRIPTION

Figure 1:
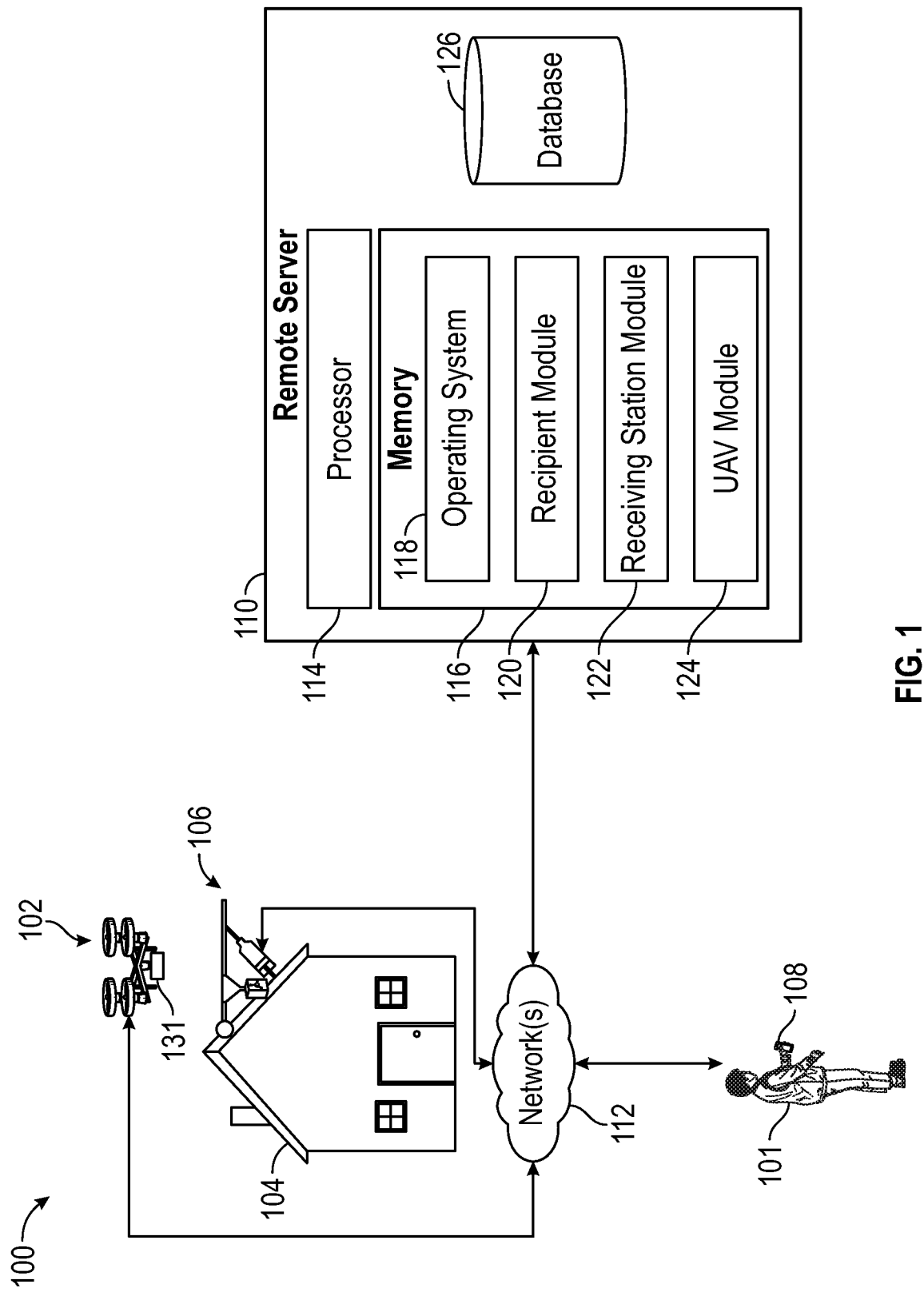
FIG. 1 depicts an illustrative architecture for delivering a package from a UAV to a recipient using a rooftop package receiving station in accordance with one or more embodiments of the disclosure.

The disclosure is related to systems and methods for delivering a package from a UAV to a consumer using a receiving station disposed on the rooftop of a building. The rooftop receiving station communicates with approaching UAV to establish that the package is destined for the address corresponding to the receiving station, and in some embodiments, the name of the recipient. In another embodiment, the rooftop receiving station obtains the recipient name and unit number, if any, from a remote server via a network connection. After communication has been established and the address has been verified, the rooftop receiving station deploys a package receiving platform such that the package can be dropped from the UAV into the package receiving platform without the UAV needing to land. In some instances, the package receiving platform transfers caught packages to a secure package safe until the intended recipient requests that the package be transported to the ground or other destination, such as a residential balcony, window, door, or the like.

The receiving station can keep a record of each package received, and in multiunit properties, a record of each apartment that has received a package. In some embodiments, the receiving station can act as (or include) a beacon or landmark to allow the UAV to more precisely locate itself, allowing the UAV to make accurate deliveries in inclement weather, such as rain, snow, or high winds. For example, the receiving station can act as a beacon or landmark using a Real-Time Kinematic GPS antenna to receive GPS signals and to transmit position correction information based on the GPS signal to an approaching UVA. In one embodiment, the receiving station can include one or more markings such as April Tags, QR codes, machine-readable optical labels, or similar graphics, or other visual identifier that allow a UAV to identify the receiving station using a camera and computer vision detection algorithms or the like.

The package receiving station can be installed on buildings with either flat or pitched roofs. In embodiments designed for installation on pitched roofs, the receiving station is configured such that the package receiving platform lies flat in general conformity with the pitch of the roof when not in use. In such an embodiment, the package receiving platform is hinged on the top side, i.e., the side highest in elevation in the general plane of the roof, such that when a UAV approaches, the bottom side of the platform, i.e., the side lowest in elevation in the general plane of the roof, can be raised using an actuator (e.g., a linear actuator or the like) to position the platform into a generally horizontal position to receive a package from the UAV.

In embodiments installed on flat roofed buildings, the package receiving station can be configured to include a package receiving platform that is generally horizontal and fixed in position to receive packages. In some embodiments, the package receiving platform is not fixed. Rather, the package receiving platform is positioned generally within the footprint of the package receiving station when not in use, and the package receiving platform can be extended beyond the edge of the building using an actuator (e.g., a linear actuator or the like) to receive a package from a UAV.

In some embodiments, the package receiving platform can include a funnel or the like to direct a delivered package to a package safe. Once the package is disposed within the package safe, the package can be delivered using a package delivery assembly to lower the package safe (with the package therein) to the ground level or a selected building architectural feature, such as a balcony, window, or door, etc.

In some embodiments, the package receiving station is connected to passageway thorough the interior of the building, such as a chute, shaft, or elevator, through which the package can be transported from the roof to the recipient at another location in the building. In some embodiments, the interior passageway is connected to one or more storage lockers where the package remains secured until the recipient can access the locker.

In some embodiments, the package receiving station includes a package delivery assembly configured to lower the package safe from the rooftop to ground level to allow a package recipient to retrieve a delivered package. For example, the package delivery assembly can include a cable and winch attached to the package safe that allows the package safe to be lowered to ground level and then retracted after the package has been removed by the recipient. In some embodiments, the package safe can include wheels to allow the package safe to roll down the exterior of the building. Alternatively, the package safe can be attached to a guide feature, such as a rail or track installed along the outside of the building to guide the package safe around obstacles and provide stability during descent and assent. In embodiments installed at multiunit buildings, the package delivery assembly can include a roof guide feature installed horizontally along the roof line that allows the package delivery assembly to traverse horizontally across a face of the building. The roof guide feature allows the package delivery assembly to position itself above a plurality of delivery locations, such a balcony or window corresponding to an individual unit. When a package recipient requests that the receiving station deliver his package, the recipient can indicate whether he wants the package delivered to his balcony or window rather than to a ground level location. The package recipient communicates with the package receiving station using a smart phone, computer, tablet, or similar web-connected device using a dedicated application or through a webpage interface. The package receiving station communicates with recipients using a network, such as the internet or local area network, through a wireless transceiver, i.e., a transceiver for a cellular telephone network, Wi-Fi, or Bluetooth, or a wire connection to a modem.

In one embodiment, the package receiving station is configured to communicate with one or more package recipients using a remote server connected to the network. The remote server can be configured to store and process data at a secure location such as a distributed data center, where network service is highly reliable and not dependent on conditions at the site of the package receiving station, i.e., access to electrical power, network latency, network bandwidth, or hardware failures. For instance, the remote server can include a database to storing recipient information needed to make a delivery, such as name, address, approximate GPS coordinates, and type of building roof—flat or pitched, as well as administrative data such as username, password, account history, delivery confirmations, etc.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Turning now to the drawings, FIG. 1 depicts an illustrative architecture 100 in which techniques for providing the systems and methods disclosed herein may be implemented. The illustrative architecture 100 may include a UAV 102 carrying a package 131, a building 104 with a package receiving station 106 configured to receive the package 131, a recipient 101 associated with a recipient device 108, and one or more remote servers 110. The various components can interact with each other directly or indirectly over one or more networks 112.

The networks 112 may include any one or a combination of multiple different types of networks, such as cable networks, the Internet, wireless networks, and other private and/or public networks. The UAV 102 and the receiving station 106 may also communicate directly via dedicated short-range communications, radio, Bluetooth, near-filed communications, cellular communications, or local area wireless networks such as Wi-Fi or Wi-Fi direct. Any suitable communications network may be used herein.

The remote server 110 may be any type of computing devices, such as, but not limited to, mobile, desktop, server computers and/or cloud computing servers. The remote server 110 may include one or more servers, perhaps arranged in a cluster, as a server farm, or as individual servers not associated with one another. Other server architectures may also be used to host the remote server 110. The remote server 110 may be equipped with one or more processors 114 and a memory 116 that may include an operating system 118 and one or more application programs or services for implementing the features disclosed herein, including a recipient module 120, a receiving station module 122, and in some embodiments a UAV module 124. The remote server 110 may further be equipped with a one or more databases 126 used by the recipient module 120, the receiving station module 122, and/or the UAV module 124 that are configured to communicate with the recipient device 108, the package receiving station 106, and/or the UAV 102, respectively.

Figure 2A:
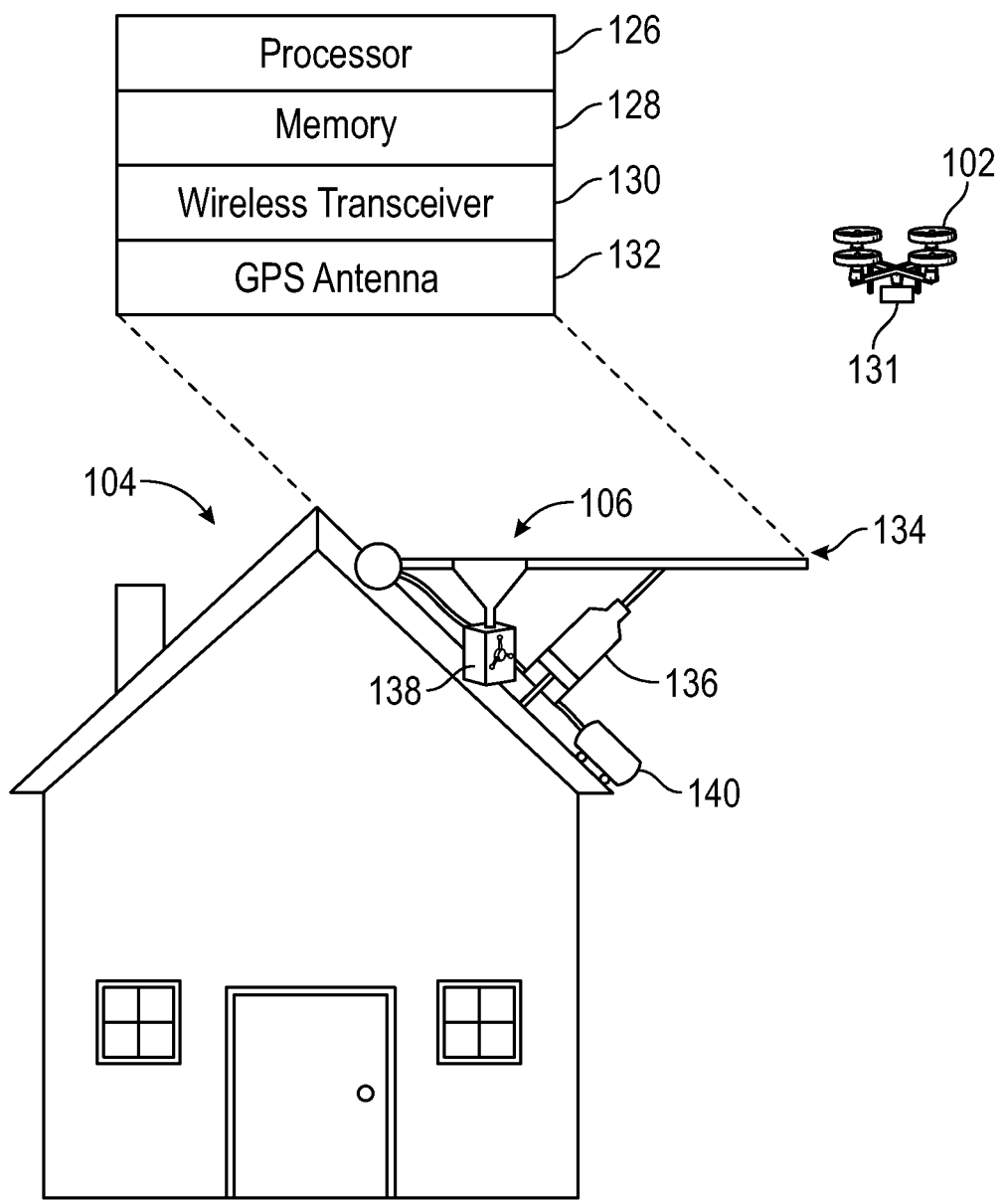
FIG. 2A depicts a rooftop package receiving station in accordance with one or more embodiments of the disclosure.
Figure 2B:
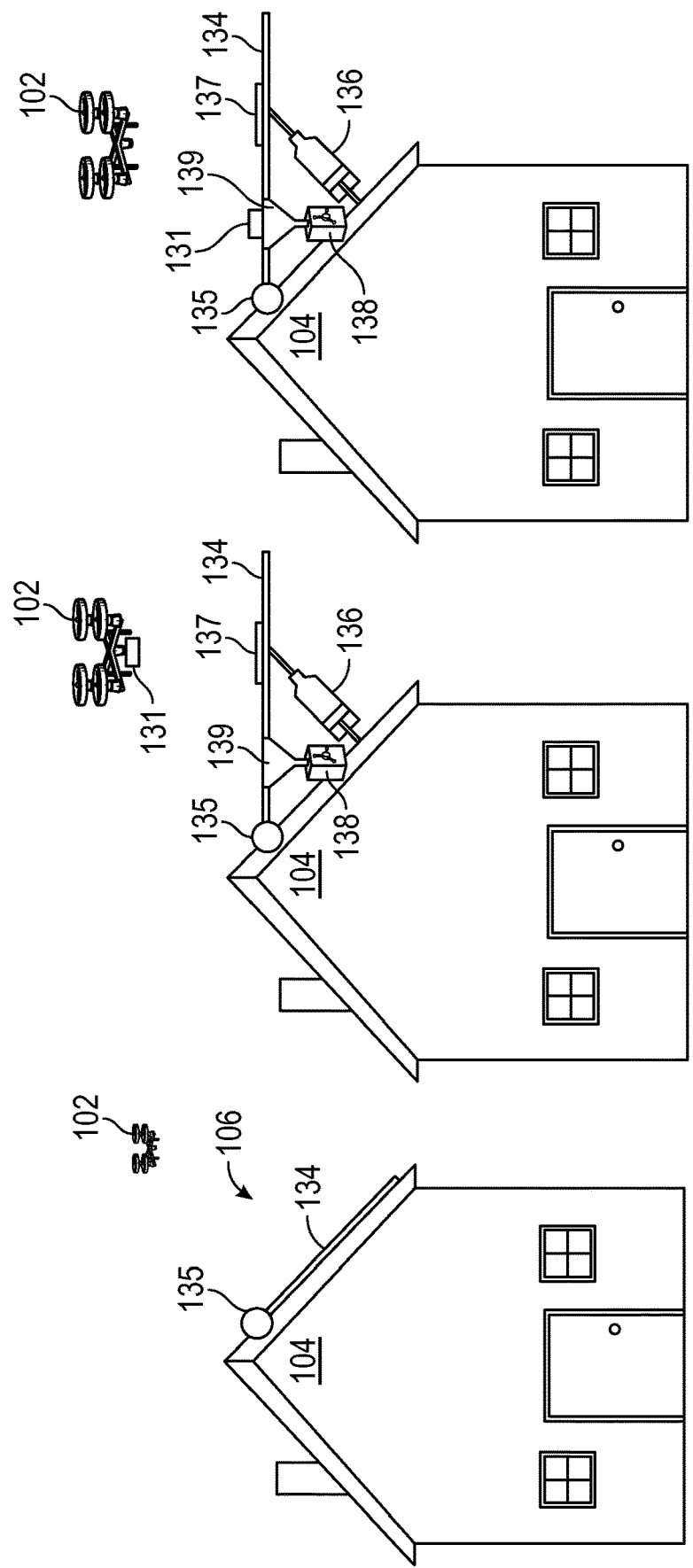
FIG. 2B depicts a sequence of a rooftop package receiving station in accordance with one or more embodiments of the disclosure.

As depicted in FIG. 2A, package receiving station 106 may include one or more processors 126 and a memory 128 that include software configured to control functions of the package receiving station 106 including those of a wireless transceiver 130, a GPS antenna 132, and a package receiving platform 134 that may include one or more actuators 136. The package receiving station 106 further includes a package safe 138 and a package delivery assembly 140. The package receiving station 106 communicates with an incoming UAV 102 using wireless transceiver 130 to initiate a package delivery. The package receiving station 106 and the UAV 102 communicate to confirm the package receiving station is located at the address of the package being delivered, and once confirmation is successful, the package receiving station 106 uses GPS antenna 132, the processors 126, and the memory 128 to receive GPS signals and compute a GPS correction signal. The package receiving station 106 communicates the GPS correction to UAV 102 to allow the UAV 102 to precisely locate itself above the package receiving platform 134. FIG. 2B depicts an embodiment illustrating a sequence of an approaching UAV 102 delivering the package 131 and a movable package receiving platform 134, such as those on pitched roof tops. In embodiments with a movable package receiving platform 134, the package receiving station 106 uses actuators 136 to move the package receiving platform 134 about a pivot 135 from a stowed position into a deployed position to receive the package 131 from the UAV 102. Once the package receiving platform 134 is in the deployed position, the package receiving station 106 communicates to the UAV 102 that it is ready for the package 131 to be delivered, e.g. dropped or placed on the package receiving platform 134. The UAV 102 then hovers above the package receiving platform 134 and drops or places the package 131 onto and/or into the package receiving platform 134. The UAV 102 positions itself over the package receiving platform 134 using GPS coordinates, and in some embodiments, computer vision processing. In embodiments using a computer vision processes, the package receiving platform 134 includes one or more visual markers 137 to aid the computer vision process, such as QR codes, April Tags, machine-readable optical labels, etc.

In some instances, once the package had been delivered to the package receiving platform 134, package receiving station 106 transfers the package to package safe 138 using a transfer device 139, such as a funnel, chute, dumping tray, trap-door, or combination of mechanisms. In an embodiment, the package 131 can be transferred from package receiving platform 134 to the package delivery assembly 140, such as a dumbwaiter or similar elevator to be lowered from the rooftop to a location more accessible by the recipient, as depicted in FIG. 2C. The package safe 138 can be part of the package delivery assembly 140 (e.g., the package safe 138 can be disposed within the elevator or dumbwaiter), or alternatively, the package safe 138 can be located at the base of the dumbwaiter, such as, by way of example, one or more lockers that receive the package from the dumbwaiter or elevator.

Figure 3:
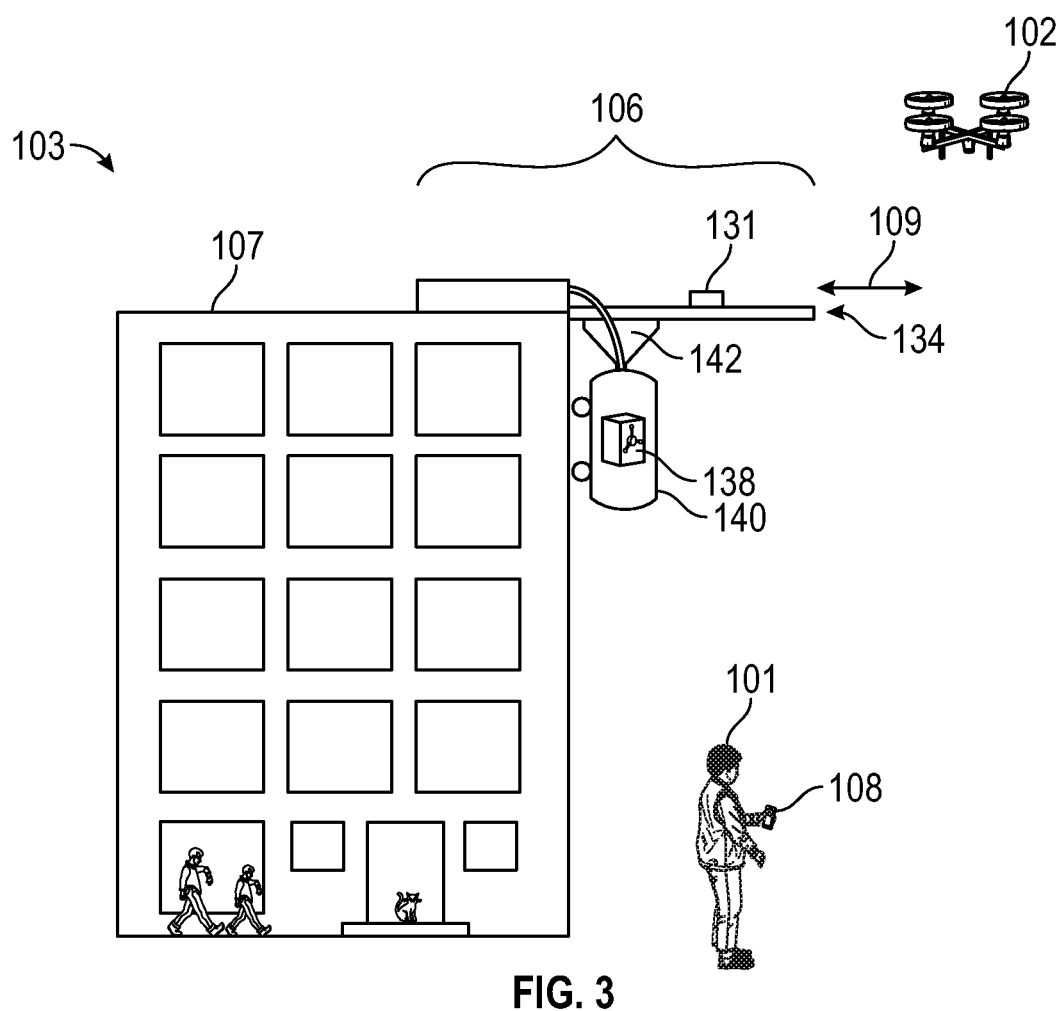
FIG. 3 depicts a rooftop package receiving station in accordance with one or more embodiments of the disclosure.

FIG. 3 depicts an embodiment of the system installed on a multiunit building 103. As shown, the package receiving station 106 is located on the roof 107 of the building 103 and is equipped with a movable package receiving platform 134 that can be extended out past the edge of the building (as indicated by arrow 109) to receive packages from the UAV 102 and to deliver the packages down the face of the building 103 using the package delivery assembly 140. In other instances, the package receiving platform 134 may not be cantilevered over the roof 107. In such instances, the UAV 102 may deliver the package 131 onto the roof 107, where the package 131 may be transferred to the package delivery assembly 140. In some instances, the package delivery assembly 140 may include the chute 142 and the package safe 138. In the embodiment shown in FIG. 3, the package 131 may be transferred from the package receiving platform 134 into the chute 142. For example, the package 131 may be transferred from the package receiving platform 134 into the chute 142 as the package receiving platform 134 is retracted (as indicated by arrow 109) by the packager receiving station 106. In other instances, a conveyor system or the like may transfer the package 131 from the package receiving platform 134 into the chute 142. Once the package 131 is in the package safe 138, the package delivery assembly 140 can lower the package safe 138 down the exterior of the building 103 to deliver the package 131 to the package recipient 101. Once the package 131 has been delivered, the package delivery assembly 140 can be retracted to deliver additional packages.

Figure 4A:
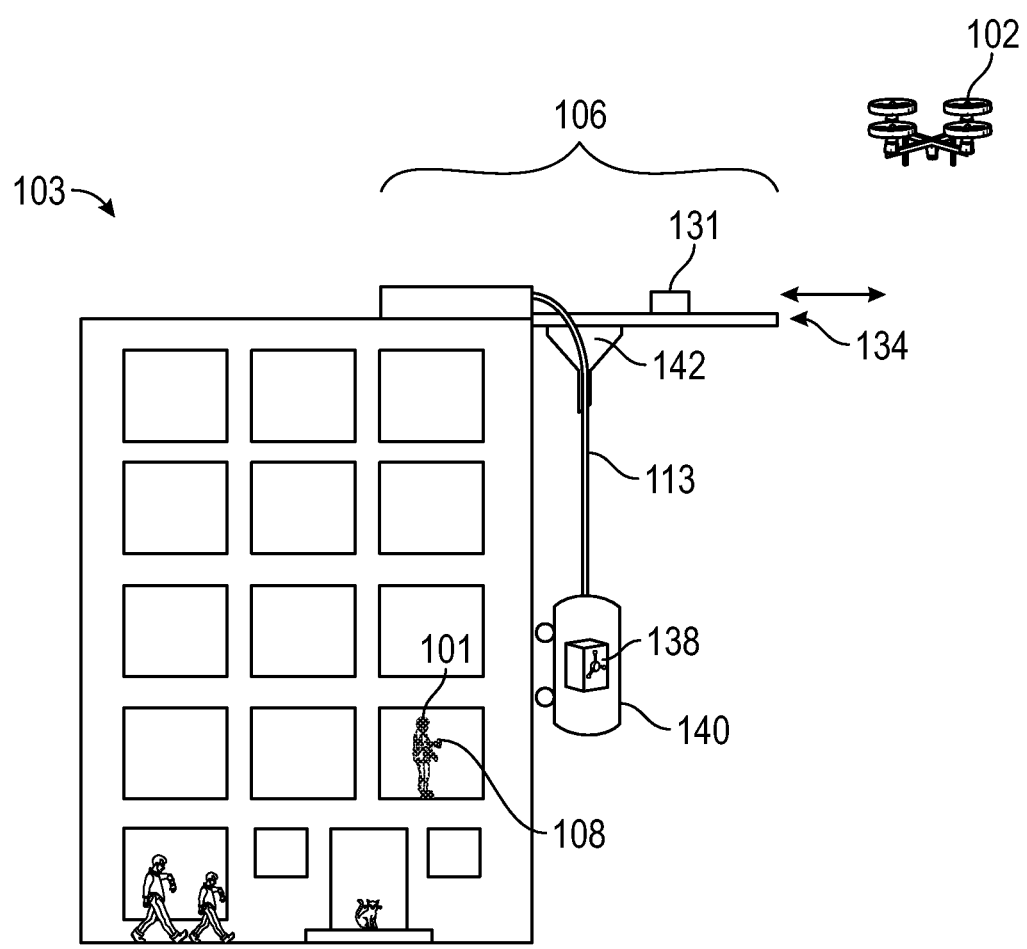
FIG. 4A depicts a rooftop package receiving station in accordance with one or more embodiments of the disclosure.

FIG. 4A illustrates an embodiment of the system configured to deliver the package 131 to a recipient 101 at a balcony or window in the multiunit building 103. In this embodiment, the package receiving station 106 receives a delivery location in conjunction with a notification that the package recipient 101 is ready to retrieve the package 131 from the package safe 138. The package receiving station 106 uses processor 126 and memory 128 to determine the position of the delivery location relative to the package delivery station 106, and to control the descent of the package delivery assembly 140 via a cord 113 or the like to stop at the location. Once at the delivery location, the recipient 101 can access the package safe 138 to retrieve the package 131. For example, the recipient 101 may enter a code into a lock of the package safe 138 or enter a code into an app on the user device 108 to unlock the package safe 138.

Figure 4B:
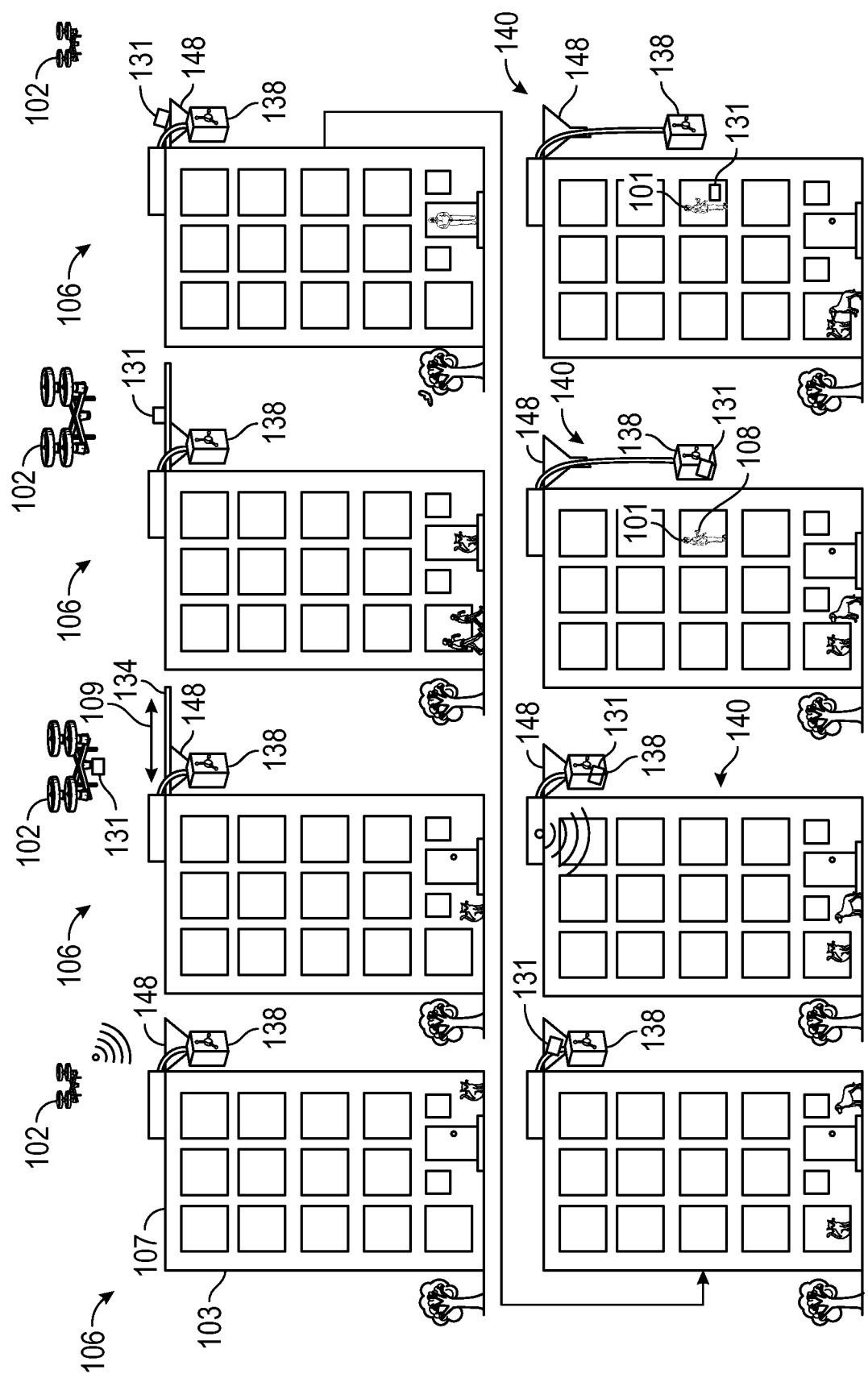
FIG. 4B depicts a sequence of a rooftop package receiving station in accordance with one or more embodiments of the disclosure.

FIG. 4B depicts an embodiment illustrating a sequence from left to right and top to bottom of an approaching UAV 102 delivering the package 131 to the movable package receiving platform 134 on the roof 107 of the multiunit building 103. The package 131 is dropped onto the package receiving platform 134 (which may be extended and retracted), transferred to the package safe 138 via the chute 148, and lowered to the recipient 101 via the package delivery assembly 140. Once at the delivery location, the recipient 101 can access the package safe 138 to retrieve the package 131. After the package 131 is delivered, the package delivery assembly 140 retracts the package safe 138 back to the roof 107 of the building 103.

Figure 5:
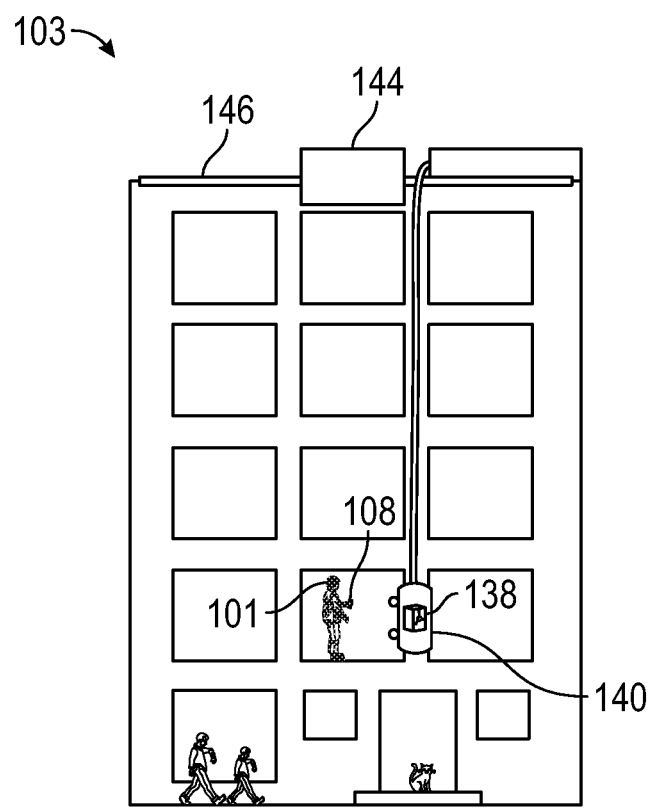
FIG. 5 depicts a rooftop package receiving station in accordance with one or more embodiments of the disclosure.

FIG. 5 illustrates an embodiment of the system configured to horizontally traverse the building 103 to increase the number of delivery locations. As shown, the package receiving station 106 includes a traversing element 144 disposed on a track 146 mounted to the exterior of the building 103. The traversing element 144 is in mechanical communication with the package delivery assembly 140 and is configured to enable the package delivery assembly 140 to move the package safe 138 horizontally along building 103. This allows the package delivery assembly 140 to position itself about a balcony or window of a package recipient 101 and to lower the package safe 138 when prompted by the recipient 101 via the recipient device 108.

The package recipient communicates with the system using a web-enabled device 108 such as a smart phone, tablet, or computer. The package receiving station 106 notifies the recipient of a package delivery by sending a notice to the recipient device 108. The package receiving station 106 may deliver the notice through the network 112 either directly to recipient device 108 or through the remote server 110. The notice will indicate that a package has been received by the package receiving platform 106, and may include additional information, such as, by way of example, time of delivery, recipient name, sender name, or package weight. The package receiving station 106 may obtain some of the additional information directly from the received package, or elements of additional information may be added to a notice by the remote sever 110 from the database 126. The remote server 110 may also be configured to communicate with one or more third party servers, such as shipping companies, to obtain one or more elements of additional data.

When a recipient is ready to retrieve a package from the package safe 138, the recipient uses the recipient device 108 to initiate the package retrieval. The recipient device 108 communicates with the package receiving station 106, directly or through the remote server 110, to begin the delivery. In some instances, the package receiving station 106 maneuvers into place when the recipient is ready to retrieve the package. In one embodiment, the package receiving station 106 uses the package delivery assembly 140 to lower the package safe 138 to the ground where the recipient opens the package safe 138 to retrieve the package. In other embodiments, the package receiving station 106 uses the package delivery assembly 140 to lower the package safe 138 to the delivery location, such as a balcony or window. In embodiments with a traversing element 144, the package receiving station 106 positions the package delivery assembly 140 above the delivery location using the traversing element 144 and then lowering the package safe 138 to the delivery location, i.e., a balcony, window, or ground.

Access to the package safe 138 can be controlled using an electronic locking device where an access code is provided to the recipient on the recipient device 108. The package safe 138 may use a new access code for each package delivery, allowing multiple people to use the system each only having access to the package safe 138 when their package is present. In some instances, the package safe 138 may include multiple compartments, and the recipient may only access one of the compartments. The access code for the package safe 138 can be presented to the user on the recipient device 108 after the recipient initiates delivery of the package.

Illustrative Processes

Figure 6:
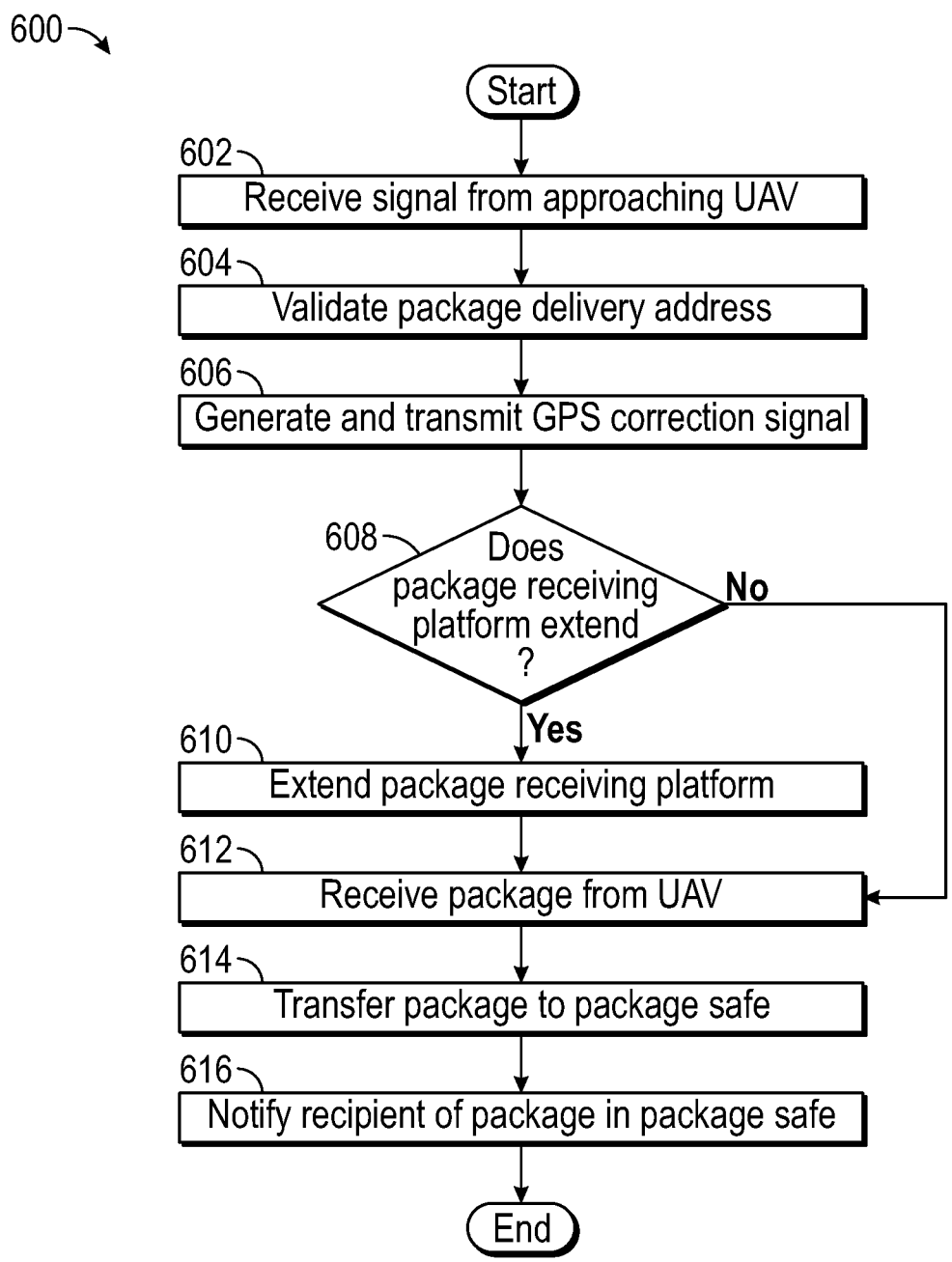
FIG. 6 depicts a flow diagram for receiving a package from a UAV at a rooftop package receiving station in accordance with one or more embodiments of the disclosure.

FIG. 6 illustrates the process 600 for receiving a package at the package receiving station 106, as described above. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Process 600 begins at step 602, with package receiving station 106 receiving a signal from an approaching UAV 102 attempting to deliver a package. At step 604, the package receiving station 106 validates the package delivery by confirming the package's delivery address corresponds to the address of the building 102. The package receiving station 106 can maintain the address of the building 102 within the memory 116 or may obtain the address from the remote server 110. Once the delivery has been validated, the package receiving station 106 prepares to receive the package. In step 606, the package delivery station 106 uses the GPS antenna 132 to receive the GPS signals, to generate a GPS correction signal, and to communicate the GPS correction signal to the UAV 102. Use of the GPS correction signals is not required but allows the UAV 102 to position itself much more precisely, which increases the likelihood that the package will be dropped or placed into/on the package receiving platform 134. The GPS correction signals and the increased accuracy they deliver allows the UAV 102 to make deliveries in inclement weather, including high winds and precipitation. Next, in step 608, the package delivery station 106 determines whether the package receiving platform 134 needs to be extended to receive the package delivery. For example, a package receiving station 106 installed at a building with a pitched roof may need to extend the package receiving platform 134 from the plane of the roof to a generally horizontal position to receive the package. As a further example, a package receiving station 106 installed at a building with a flat roof that contains obstructions, such a communication antenna, satellite dish, HVAC equipment, or similar hazards to UAV flight, may need to extend the package receiving platform 134 over the edge of the building to create a safe delivery location. The package delivery station 106 may determine whether it needs to extend the package delivery platform 134 by referring to saved data in memory 128, by receiving the relevant data from remote server 110, or both. When the package delivery platform 134 needs to be extended, the package receiving station 106, in step 610, extends the package receiving platform 134 using one or more actuators 136. In step 612, the package receiving station 106 receives the package from the UAV 102, by communicating to the UAV 102 that the package receiving station 106 is ready for the delivery. The UAV 102, after being informed that the package receiving station 106 is ready, hovers over the package receiving platform 134 and drops the package. In some instances, the UAV 102 does not need to land on the package receiving platform 134 to make the delivery, which eliminates the need for the UAV 102 to include landing gear and its corresponding weight, thereby improving the performance of the UAV 102.

In step 614, the package receiving station 106 transfers the package from the package receiving platform 134 to the package safe 138. In some embodiments, the package is transferred using a chute 142 connecting the package receiving platform 134 and the package safe 138. The package can enter the chute 142 in a variety of ways. For example, the package can slide along the surface of package receiving platform 134 to chute 142 using gravity or by mechanical manipulation, such as by a conveyor or retracting the extended package receiving platform 134. The package receiving platform 134 may also include a trapdoor or similar opening that allows the package to drop through the package receiving platform 134 into the chute 142. Moving to step 616, the package receiving station 106 notifies the recipient that a package has been delivered. For example, the package receiving station 106 generates an electronic package notice and sends the notice through network 112 either directly to the recipient device 108 or to remote server 110, which then sends the notice to the recipient device 108. The package notice can include additional information about the package and its delivery, such as, by way of example, time of delivery, name of recipient, name of sender, and weight. Such additional information can be obtained from the package receiving station 106 itself by direct observation of the package, from the remote server 110, or both. Once the package notification has been sent, the process 600 is complete. The process 600 may be repeated for a number of packages.

Figure 7:
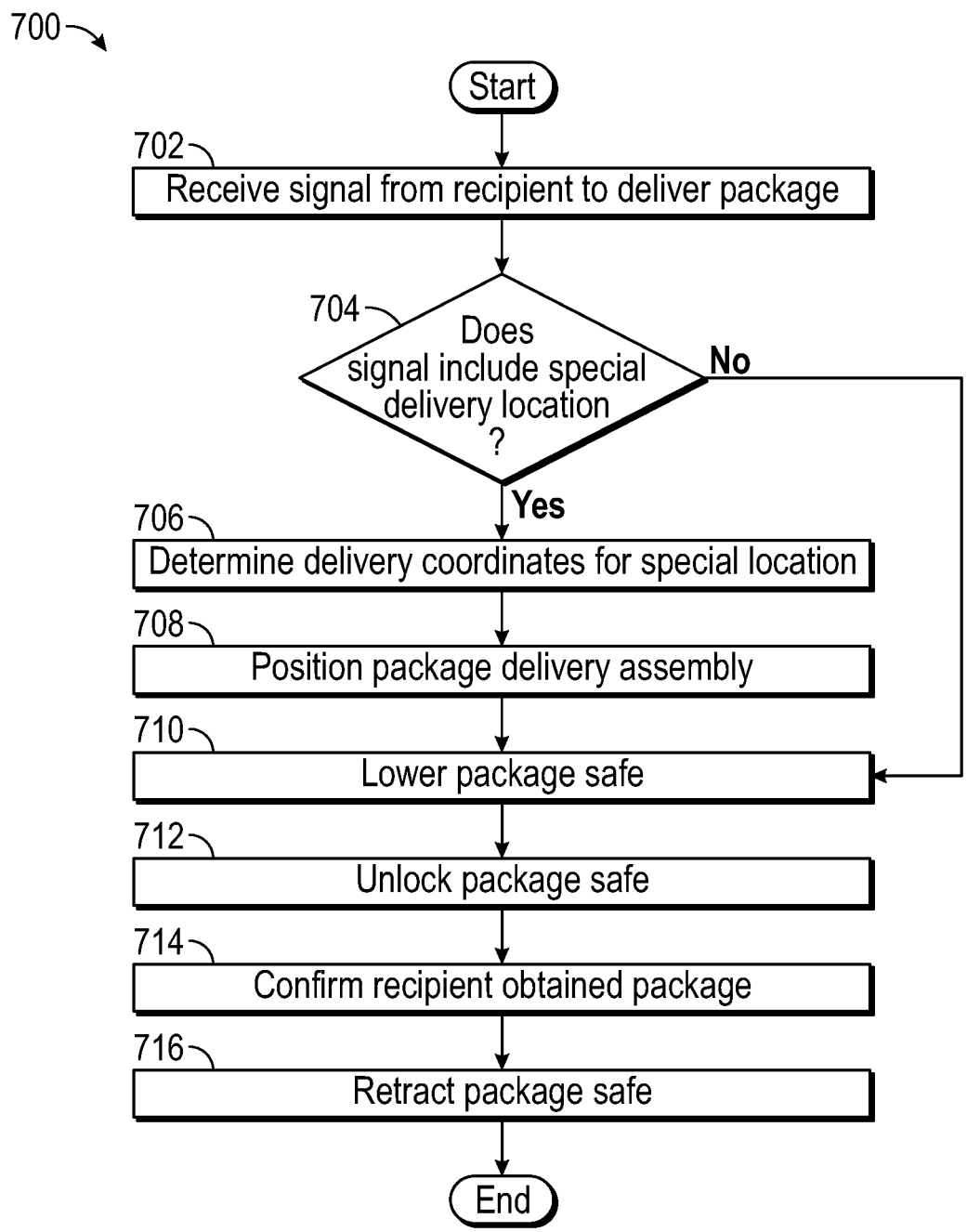
FIG. 7 depicts a flow diagram for delivering a package from a rooftop package receiving station to a recipient in accordance with one or more embodiments of the disclosure.

FIG. 7 illustrates the process 700 of delivering a package from the package receiving station 106 to a recipient. The process 700 begins at step 702, where the package receiving station 106 receives a notice that the recipient is ready to retrieve the package. The notice can be sent from the recipient device 108 directly to the package receiving station 106 using a short-range communication protocol, such as, by way of example, Bluetooth or Wi-Fi, or using network 112.

Alternatively, the notice can be sent from the recipient device 108 to the remote server 110, which then sends the notice to the package receiving station 106. In embodiments allowing the package to be delivered to a variety of locations, the notice may include a special delivery location. In step 704, the package receiving station 106 parses the notice to determine if it includes a special delivery location. If so, the process proceeds to step 706 where the package delivery station 106 generates delivery coordinates corresponding to the special delivery location. For example, if the special delivery location is a third-floor apartment window for a six story building, the delivery coordinates would be a distance of three floors from the package delivery assembly 140. In embodiments including a traversing element 144, the delivery coordinates will include a horizontal distance that the package delivery assembly 140 needs to traverse. In step 708, the package receiving station 106 positions the package delivery assembly 140 above the delivery location in embodiments with a traversing element. For example, as shown in FIG. 5, the package delivery assembly 140 would need to traverse one apartment unit from the package delivery station 106 to be able to deliver a package to the unit with the recipient. In step 710, the package delivery assembly 140 lowers the package safe 138 to the delivery location. In a single-family dwelling, the delivery location may be ground level beneath the package receiving station 106. In embodiments that include special delivery locations, the package delivery assembly 140 lowers the package safe 138 to the delivery location using the delivery coordinates. The package delivery assembly 140 includes once or more encoders used by processor 126 to determine how far the package safe 138 has been lowered. In step 712, the package safe 138 is unlocked to allow the recipient to retrieve the package. The package receiving station 106 can unlock the package safe 138 automatically once lowered to the delivery location, or the package receiving station can prompt the recipient for an access code on the recipient device 108 or the package safe 138 prior to unlocking the package safe 138. In step 714, the package receiving station 106 prompts the recipient on the recipient device 108 to confirm they have finished retrieving the package from the package safe 138. Once the recipient confirms that they are finished retrieving the package from the package safe 138, the package receiving station 106 uses the package delivery assembly 140 to retract the package safe 138 from the delivery location to the rooftop to await another package delivery. The process 700 is complete once the package safe 138 has been retracted to the roof and process 700 may then be repeated.

Embodiment Examples

In some instances, the following examples may be implemented together or separately by the systems and methods described herein.

Example 1 may include a method for delivering a package from an unmanned aerial vehicle to a recipient, the method comprising: identifying, by a package receiving station disposed on a roof of a building, an unmanned aerial vehicle; establishing, by the unmanned aerial vehicle and the package receiving station, a wireless communication connection between the unmanned aerial vehicle and the package receiving station; receiving, by the package receiving station, the package from the unmanned aerial vehicle, wherein the package receiving station includes a package receiving platform configured to receive the package and a package delivery assembly; transferring the package from the package receiving platform to the package delivery assembly; and delivering the package, by the package delivery assembly, to a delivery location.

Example 2 may include the method of example 1, further comprising: notifying the recipient of the package; receiving a recipient delivery request from a recipient device; unlocking the package safe; receiving input from the recipient device that the recipient has retrieved the package; and retracting the package delivery assembly.

Example 3 may include the method of example 1 and/or some other example herein, further comprising: receiving a GPS signal; generating a GPS correction signal; and communicating the GPS correction signal to the unmanned aerial vehicle.

Example 4 may include the method of example 1 and/or some other example herein, further comprising extending the package receiving platform from a first position to a second position, wherein the package is received from the unmanned aerial vehicle in the second position.

Example 5 may include the method of example 4 and/or some other example herein, wherein transferring the package from the package receiving platform to the package delivery assembly comprises transferring the package to a package safe through a chute.

Example 6 may include the method of example 5 and/or some other example herein, further comprising retracting the package receiving platform from the second position to the first position, wherein the retracting causes the package to move through the chute.

Example 7 may include the method of example 2 and/or some other example herein, further comprising: determining a special delivery location; and generating a delivery coordinate from the special delivery location, wherein the special delivery location is used as the delivery location.

Example 8 may include the method of example 7 and/or some other example herein, further comprising positioning the package delivery assembly using a traversal element using the delivery coordinate.

Example 9 may include the method of example 8 and/or some other example herein, wherein the package is lowered a distance from the package delivery assembly determined from the delivery coordinate.

Example 10 may include the method of example 5 and/or some other example herein, wherein unlocking the package safe comprises requesting an access code on the recipient device, receiving an access code input from the recipient device, and validating the access code.

Example 11 may include the method of example 10 and/or some other example herein, wherein validating the access code comprises sending the access code to a remote server having an access code database including valid access codes and receiving a response from the remote server confirming the access code input matched a valid access code.

Example 12 may include a system for delivering packages from an unmanned aerial vehicle to a recipient, the system comprising: a package receiving station positioned on the roof of a building, the package receiving station comprising: a package receiving platform; a package safe; a package delivery assembly; at least one memory that stores computer-executable instructions; and at least one processor configured to access the at least one memory, wherein the at least one processor is configured to execute the computer-executable instructions to: identify an unmanned aerial vehicle; establish a wireless communication connection between the unmanned aerial vehicle and the package receiving station; receive a package dropped from the unmanned aerial vehicle; transfer the package from the package receiving platform to a package safe; notify the recipient of the package; receive a recipient delivery request from a recipient device; lower the package safe using the package delivery assembly to a delivery location; unlock the package safe; receive input from the recipient device that the recipient has retrieved the package; and retract the package safe using the package delivery assembly.

Example 13 may include the system of example 12, further comprising a GPS antenna, wherein the processor is further configured to execute the computer-executable instructions to: receive a GPS signal; generate a GPS correction signal; and communicate the GPS correction signal to the unmanned aerial vehicle.

Example 14 may include the system of example 12 and/or some other example herein, wherein the processor is further configured to execute the computer-executable instructions to extend the package receiving platform from a first position to a second position.

Example 15 may include the system of example 14 and/or some other example herein, the package receiving station further comprising a chute linking the package receiving platform and the package safe, wherein the package travels through the chute when transferred from the package receiving platform and the package safe.

Example 16 may include the method of example 15 and/or some other example herein, the processor being further configured to execute the computer-executable instructions to retract the package receiving platform from the second position to the first position.

Example 17 may include the system of example 12 and/or some other example herein, the processor being further configured to execute the computer-executable instructions to: determine a special delivery location; and generating a delivery coordinate from the special delivery location, wherein the special delivery location is used as the delivery location.

Example 18 may include the system of example 17 and/or some other example herein, the package receiving station further comprising a traversal element; and the processor being further configured to execute the computer-executable instructions to position the package delivery assembly along the traversal element using the delivery coordinate.

Example 19 may include the method of example 18 and/or some other example herein, the processor being further configured to execute the computer-executable instructions to lower the package safe a distance from the package delivery assembly determined from the delivery coordinate.

Example 20 may include a system for delivering a package from an unmanned aerial vehicle to a delivery location, the system comprising: a package receiving station positioned on a roof of a building, the package receiving station comprising a package receiving platform and a package delivery assembly; wherein the package receiving platform comprises a stowed position and a deployed position, wherein the package delivery assembly is configured to lower the package from the package receiving platform to the delivery location below the roof of the building.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method for delivering a package from an unmanned aerial vehicle to a recipient, the method comprising:
   identifying, by a package receiving station disposed on a roof of a building, an unmanned aerial vehicle;
   establishing, by the unmanned aerial vehicle and the package receiving station, a wireless communication connection between the unmanned aerial vehicle and the package receiving station;
   receiving, by the package receiving station, the package from the unmanned aerial vehicle, wherein the package receiving station includes a package receiving platform configured to receive the package and a package delivery assembly;
   transferring the package from the package receiving platform to the package delivery assembly; and
   delivering the package, by the package delivery assembly, to a delivery location.

2. The method of claim 1, further comprising:
   notifying the recipient of the package;
   receiving a recipient delivery request from a recipient device;
   unlocking a package safe of the package delivery assembly;
   receiving input from the recipient device that the recipient has retrieved the package; and
   retracting the package delivery assembly.

3. The method of claim 2, further comprising:
   determining a special delivery location; and
   generating a delivery coordinate from the special delivery location, wherein the special delivery location is used as the delivery location.

4. The method of claim 3, further comprising positioning the package delivery assembly using a traversal element using the delivery coordinate.

5. The method of claim 4, wherein the package is lowered a distance from the package delivery assembly determined from the delivery coordinate.

6. The method of claim 1 further comprising:
   receiving a GPS signal;
   generating a GPS correction signal; and
   communicating the GPS correction signal to the unmanned aerial vehicle.

7. The method of claim 1 further comprising extending the package receiving platform from a first position to a second position, wherein the package is received from the unmanned aerial vehicle in the second position.

8. The method of claim 7, wherein transferring the package from the package receiving platform to the package delivery assembly comprises transferring the package to a package safe through a chute.

9. The method of claim 8, further comprising retracting the package receiving platform from the second position to the first position, wherein the retracting causes the package to move through the chute.

10. The method of claim 8, wherein unlocking the package safe comprises requesting an access code on a recipient device, receiving an access code input from the recipient device, and validating the access code.

11. The method of claim 10, wherein validating the access code comprises sending the access code to a remote server having an access code database including valid access codes and receiving a response from the remote server confirming the access code input matched a valid access code.

12. A system for delivering packages from an unmanned aerial vehicle to a recipient, the system comprising:
   a package receiving station positioned on the roof of a building, the package receiving station comprising:
      a package receiving platform;
      a package safe;
      a package delivery assembly;
      at least one memory that stores computer-executable instructions; and
      at least one processor configured to access the at least one memory, wherein the at least one processor is configured to execute the computer-executable instructions to:
         identify an unmanned aerial vehicle;
         establish a wireless communication connection between the unmanned aerial vehicle and the package receiving station;
         receive a package dropped from the unmanned aerial vehicle;
         transfer the package from the package receiving platform to the package safe;
         notify the recipient of the package;
         receive a recipient delivery request from a recipient device;
         lower the package safe using the package delivery assembly to a delivery location;
         unlock the package safe;
         receive input from the recipient device that the recipient has retrieved the package; and
         retract the package safe using the package delivery assembly.

13. The system of claim 12 further comprising a GPS antenna, wherein the processor is further configured to execute the computer-executable instructions to:
   receive a GPS signal;
   generate a GPS correction signal; and
   communicate the GPS correction signal to the unmanned aerial vehicle.

14. The system of claim 12, wherein the processor is further configured to execute the computer-executable instructions to extend the package receiving platform from a first position to a second position.

15. The system of claim 14, the package receiving station further comprising a chute linking the package receiving platform and the package safe, wherein the package travels through the chute when transferred from the package receiving platform and the package safe.

16. The method of claim 15, the processor being further configured to execute the computer-executable instructions to retract the package receiving platform from the second position to the first position.

17. The system of claim 12, the processor being further configured to execute the computer-executable instructions to:
   determine a special delivery location; and
   generating a delivery coordinate from the special delivery location, wherein the special delivery location is used as the delivery location.

18. The system of claim 17, the package receiving station further comprising a traversal element; and
   the processor being further configured to execute the computer-executable instructions to position the package delivery assembly along the traversal element using the delivery coordinate.

19. The method of claim 18, the processor being further configured to execute the computer-executable instructions to lower the package safe a distance from the package delivery assembly determined from the delivery coordinate.

20. A system for delivering a package from an unmanned aerial vehicle to a delivery location, the system comprising:
   a package receiving station positioned on a roof of a building, the package receiving station comprising a package receiving platform and a package delivery assembly;
   wherein the package receiving platform comprises a stowed position and a deployed position,
   wherein the package receiving station transfers the package from the package receiving platform to the package delivery assembly,
   wherein the package delivery assembly is configured to lower the package from the package receiving platform to the delivery location below the roof of the building.

* * * * *